Sept. 10, 1935.  A. KUHNS ET AL  2,014,138
GEAR DRIVE
Filed June 30, 1933   2 Sheets-Sheet 1

INVENTOR
Austin Kuhns and
Paul A. Manger
by Parker, Prochnow & Kermer
ATTORNEYS

Sept. 10, 1935.   A. KUHNS ET AL   2,014,138
GEAR DRIVE
Filed June 30, 1933   2 Sheets-Sheet 2
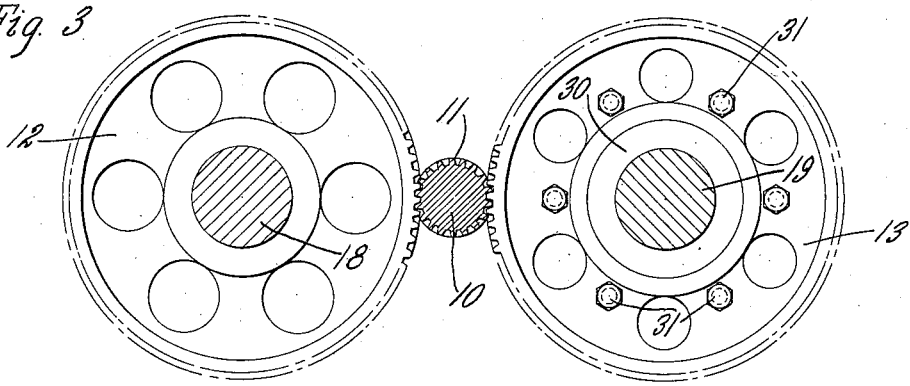
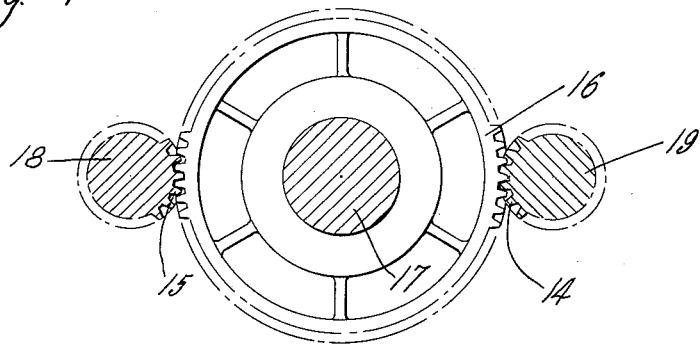
INVENTORS
Austin Kuhns and
Paul A. Manger
by Parker, Crochnow & Harmer
ATTORNEYS Patented Sept. 10, 1935

2,014,138

UNITED STATES PATENT OFFICE 2,014,138

GEAR DRIVE

Austin Kuhns, Buffalo, and Paul A. Manger, Eggertsville, N. Y., assignors to Farrel-Birmingham Company, Inc., Buffalo, N. Y.

Application June 30, 1933, Serial No. 678,362

4 Claims. (Cl. 74—410)

This invention relates to improvements in speed reducing or speed changing gearing or gear drives of that type in which power from a driving element is transmitted to a driven element through a plurality of intermediate gear units each of which transmits a portion of the power or takes a portion of the load. In its simplest form such a gear drive comprises a driven gear or element which drives two intermediate units, both of which in turn drive the driven gear or element.

Experience has shown that the problem of equalizing the power transmitting capacity of such plural intermediate units or equally dividing the load between the same has been difficult of solution. Heretofore attempts have been made to accomplish this result so that each of the several intermediate gear units will do its equal share of the work and thus enable the transmitted load to be doubled or increased correspondingly to the number of intermediate gear units employed. One such prior construction involves a specially designed torsionally resilient shaft or some form of torsionally resilient coupling. Another prior construction for the purpose includes a special rocker mechanism intended to produce relative movement between the intermediate gears or elements to take up the slack. But such previous constructions are more or less complicated or expensive, and are not durable or reliable for heavy work.

One object of this invention is to produce a speed changing gearing of this character of novel construction which, in operation, will automatically equalize or equally divide the load-carrying or power-transmitting capacity between the plural intermediate units.

Other objects of the invention are to provide a speed reduction or speed changing gear drive of simple, strong and durable construction in which the load or power transmitted will be equalized or equally divided between duplicated intermediate gears or elements; and also to provide a duplex or multiple unit gear drive which has the other features of improvement and advantage hereinafter described and set forth in the claims.

Figure 1:
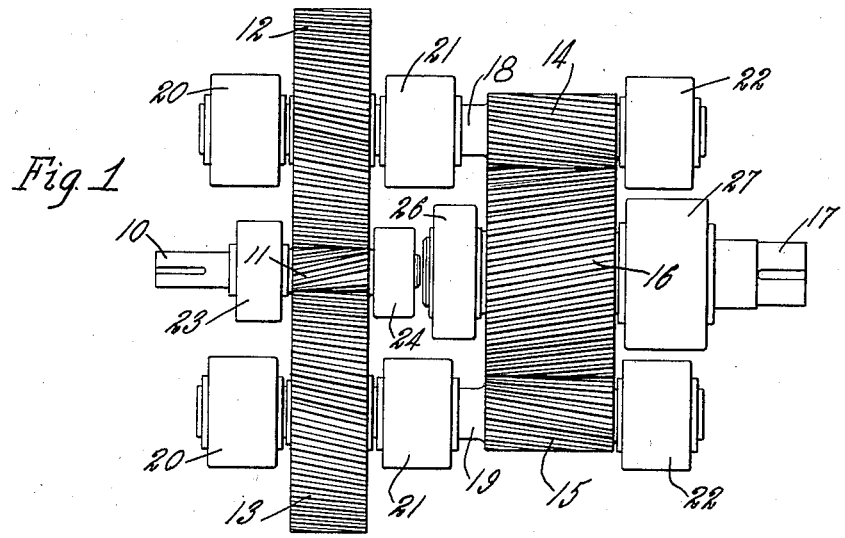
Fig. 1 is a plan view, more or less schematic, of a gear drive embodying the invention.
Figure 2:
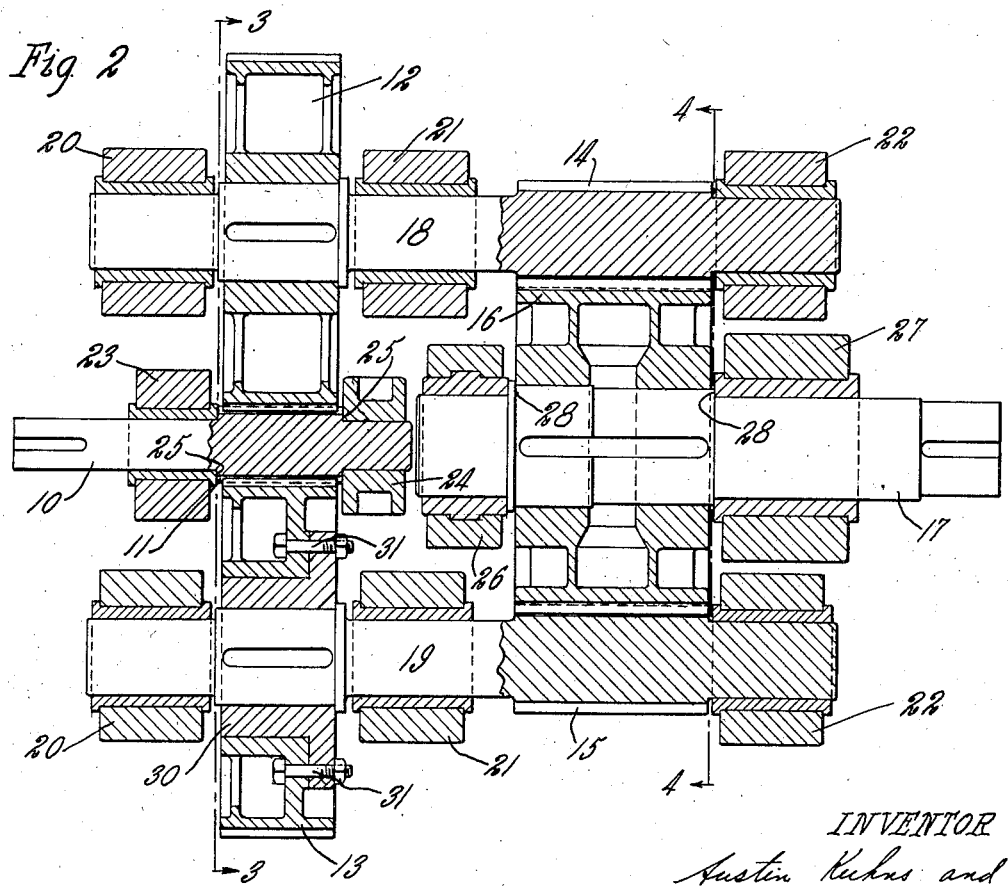
Fig. 2 is a sectional plan view, enlarged, thereof.

Figs. 3 and 4 are transverse, sectional elevations thereof on lines 3—3 and 4—4 respectively, Fig. 2.

10 represents a drive shaft or element on which is rigidly secured or formed a driving pinion 11 which meshes with and is adapted to drive two intermediate gear wheels 12 and 13 which, as shown, are arranged at diametrically opposite sides of the driving pinion 11. The gear wheel 12 is rigidly connected with an intermediate pinion 14, and the intermediate gear wheel 13 is rigidly connected with an intermediate pinion 15, and these two pinions 14 and 15 mesh with and are adapted to drive a driven gear wheel 16 rigid with the driven shaft 17. As shown, the intermediate gear wheel 12 is fixed on an intermediate shaft 18 on which the pinion 14 is formed so that this shaft with its rigidly connected gear and pinion form one intermediate gear unit; and the other intermediate gear wheel 13 is fixed on a second parallel shaft 19 on which the other intermediate pinion 15 is formed so that this shaft 19 with its rigidly connected gear and pinion form a duplicate intermediate gear unit. Each of the gear wheels and pinions of the drive is a single helical toothed gear, and the helical angles of the connected gear wheel and pinion of each intermediate unit incline in the same direction.

The gearing is constructed so as to allow a limited axial relative movement between the driving and driven pinion and gear and each intermediate gear unit. For instance, for this purpose each intermediate shaft 18 and 19, as shown, is arranged to have a limited axial movement in its supporting bearings 20, 21 and 22, but the driving shaft 10 is held against axial movement in its bearings 23 and 24 as by the engagement of oppositely facing shoulders 25 on the shaft with the adjacent ends of its bearings, and similarly, the driven shaft 17 is held against axial movement in its bearings 26 and 27, as by the engagement of oppositely facing shoulders 28 on this shaft with the adjacent ends of its bearings. Thus, each intermediate shaft and the gear wheel and pinion fixed thereon is capable of limited axial movement relatively to both the driving pinion 11 and driven wheel 16.

In the operation of the gear drive, the axially fixed helical driving pinion 11 tends to shift the intermediate helical gear wheels 12 and 13 and their shafts in the same axial direction, which axial movement, however, is limited by the reaction of axially fixed helical driven gear wheel 16 on the intermediate pinions 14 and 15. Each intermediate shaft with its gear wheel and pinion fixed thereon thus is free to float axially within limits to center itself, and when under load, if the power is not equalized on the two intermediate units, the driven gear wheel 16 will drive its unloaded pinion and automatically move the unloaded intermediate shaft axially so that it will take up its share of the load. As this unloaded shaft picks up its load, it adjusts itself more firmly to its exactly correct position. That is to say, it wedges itself just where it belongs. Theoretically, the helical angles between the first reduction and second reduction sets of gears should be adjusted with relation to the tooth pressures which these gears carry. Practically, however, this would involve a high helical angle of the high speed gears and an excessive thrust on the high speed pinion, and it is not necessary. The single helical toothed gears arranged as described will automatically center themselves and equalize the load on the intermediate gears and pinions if the same helical angle is used on the high and low speed gears in the same manner that one of two intermeshing herringbone gears will center itself even though one helical half has considerably greater face width than the other. Therefore, in practice the helical angles of the high and slow speed gears can be the same.

In the described gearing where single helical teeth are used for the high speed pinions and the slow speed gear wheels, and their axial thrust must be taken by the bearings, it is desirable not to use high helical angles. This, therefore, means that a considerable amount of axial float is necessary in each intermediate shaft to take up a given amount of slack and requires that the gearing should be fitted together carefully so that it is only necessary to rely on the automatic compensating feature to take up the very last amount of slack and compensate for any stretch in the gearing when in operation. In order to better accomplish this result, one of the gears is preferably conneced to its shaft so as to permit rotary adjustment between the gear wheel and the shaft when assembling the gearing. For instance, the gear wheel 13 is shown as provided with a separate part hub 30 on which the toothed rim is capable of rotary adjustment but to which it is fixed as by bolts 31. In setting up the gearing, all of the parts are assembled with the shafts in their bearings and the several gears intermeshing as shown, and the gearing is wound up or all of the back lash taken out. The gear wheel 13 and its hub are then locked in this position and drilled for the bolts 31, which are then secured in place to rigidly fix the gear wheel in this position to its hub.

We claim as our invention:

1. A gear drive comprising a driving pinion, a driven gear, and two intermediate gear units each comprising a gear meshing with said driving pinion and a pinion meshing with said driven gear, said gears and pinions being single helical toothed gears and the pinion and gear of each intermediate unit having teeth inclined in like direction, a rigid shaft rigidly connecting the gear and pinion of each intermediate unit, and fixed bearings rotatably mounting said shaft of each intermediate unit and in which the shaft has limited free axial movement to allow relative axial movement between each intermediate gear unit and said driving pinion and driven gear unopposed within the limits of said axial movement except by the intermeshing of the gears and pinions.

2. A gear drive comprising a driving gear, a driven gear, and a plurality of intermediate gear units each comprising rigidly connected gears of different diameters, one meshing with the driving gear and one meshing with the driven gear, said gears being single helical toothed gears, and the gears of each intermediate unit having teeth inclined in like direction, and fixed bearings mounting said intermediate gear units and allowing limited axial movement of the latter relatively to said bearings and driving and driven gears unopposed within the limits of said axial movement except by the intermeshing of the gears.

3. A gear drive comprising a single helical toothed driving pinion held from axial movement, a single helical toothed driven gear positively held from axial movement in both directions, the teeth of said pinion and gear being inclined in like direction, and two intermediate gear units each movable along an axis parallel to said driving pinion and driven gear and comprising a gear meshing with said driving pinion, a pinion meshing with said driven gear, and a rigid shaft to which said gear and pinion of the intermediate unit, are rigidly attached, the gear and pinion of each intermediate unit being single helical gears having their teeth inclined in like direction, and fixed bearings in which said shaft rotates and has limited free axial movement unopposed within the limits of said axial movement except by the intermeshing of the gears.

4. A gear drive comprising a driving gear, a driven gear, fixed bearings at opposite ends of each of said gears for rotatably mounting the gears and holding them from axial movement, and a plurality of intermediate gear units each comprising rigidly connected gears one meshing with the driving gear and one meshing with the driven gear, said gears being single helical toothed gears, and the gears of each intermediate unit having teeth inclined in like direction, and fixed bearings mounting said intermediate gear units and allowing limited axial movement of the latter relatively to said bearings and driving and driven gears unopposed within the limits of said axial movement except by the intermeshing of the gears.

AUSTIN KUHNS.
PAUL A. MANGER.